Jan. 7, 1930.  S. G. MEWBORN  1,742,715
COMBINED AIRPLANE AND HELICOPTER
Filed Oct. 19, 1928   4 Sheets-Sheet 3

INVENTOR.
SIDNEY G. MEWBORN,
BY
ATTORNEY.

Jan. 7, 1930.  S. G. MEWBORN  1,742,715
COMBINED AIRPLANE AND HELICOPTER
Filed Oct. 19, 1928  4 Sheets-Sheet 4

INVENTOR.
SIDNEY G. MEWBORN,
BY
ATTORNEY.

Patented Jan. 7, 1930

1,742,715

UNITED STATES PATENT OFFICE

SIDNEY G. MEWBORN, OF WILSON, NORTH CAROLINA

COMBINED AIRPLANE AND HELICOPTER

Application filed October 19, 1928. Serial No. 313,492.

My invention relates to a combined airplane and helicopter.

In accordance with my invention, I provide an airplane embodying a fuselage, equipped with a transverse sustaining plane. A vertical traveling propeller is carried by the fuselage, for co-operation with the sustaining plane, during the longitudinal flight of the airplane. The fuselage also carries a pair of horizontal lifting propellers. The sustaining plane is pivoted to turn upon its longitudinal axis, so that it may be arranged perpendicularly, whereby it will offer the least resistance to the vertical rise of the airplane, due to the action of the lifting propellers. When the machine has reached the desired elevation, the sustaining plane is tilted to the horizontal position, for coaction with the vertical propeller, and the action of the vertical propeller may be supplemented by the angular adjustment of the lifting propeller.

Figure 1:
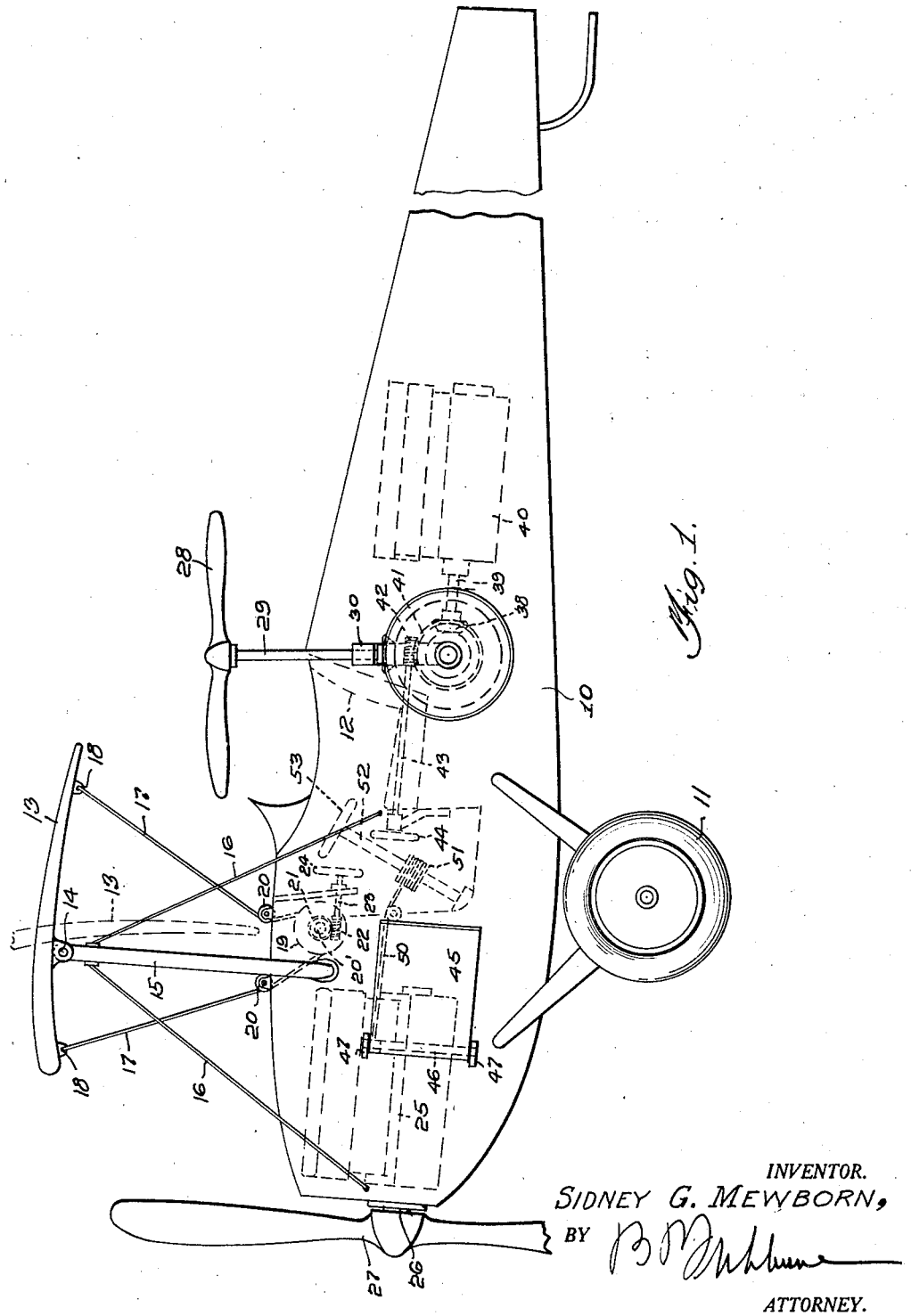
Figure 2:
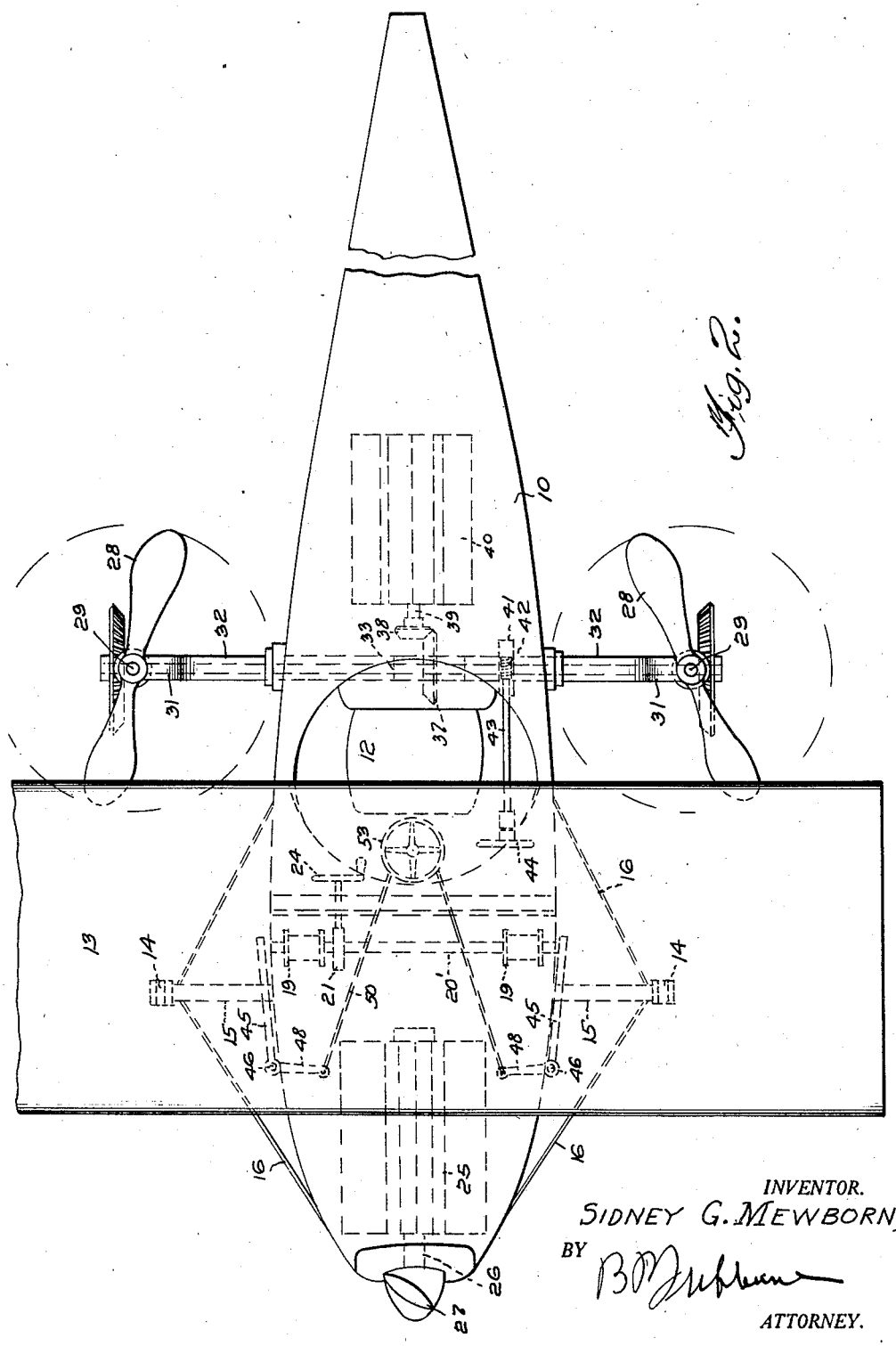
Figure 3:
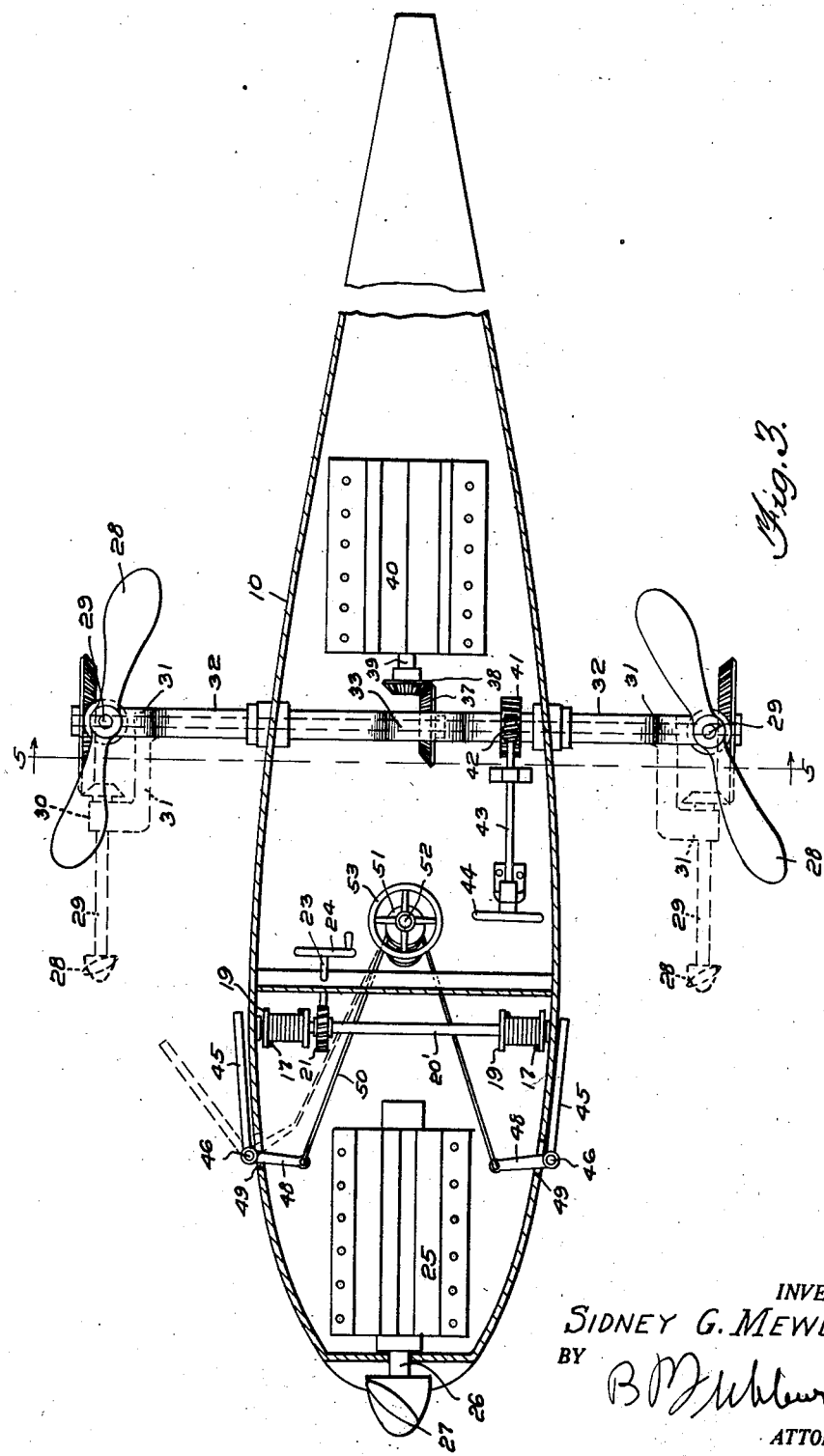
Figure 4:
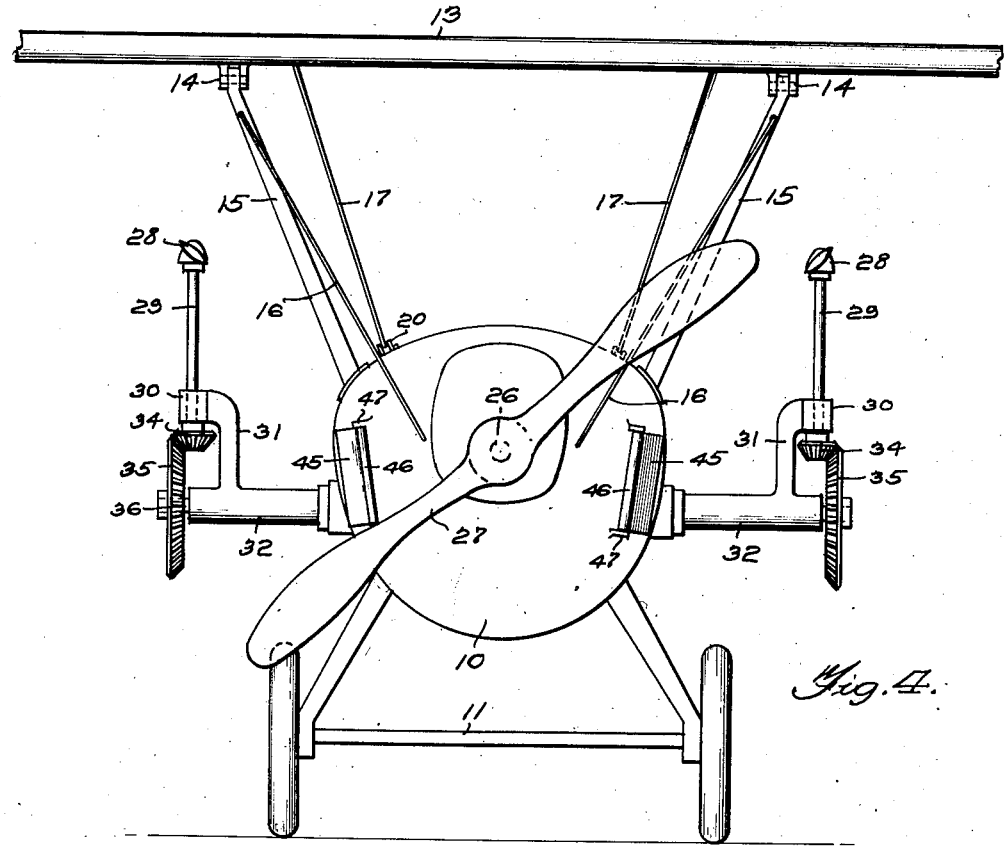
Figure 5:
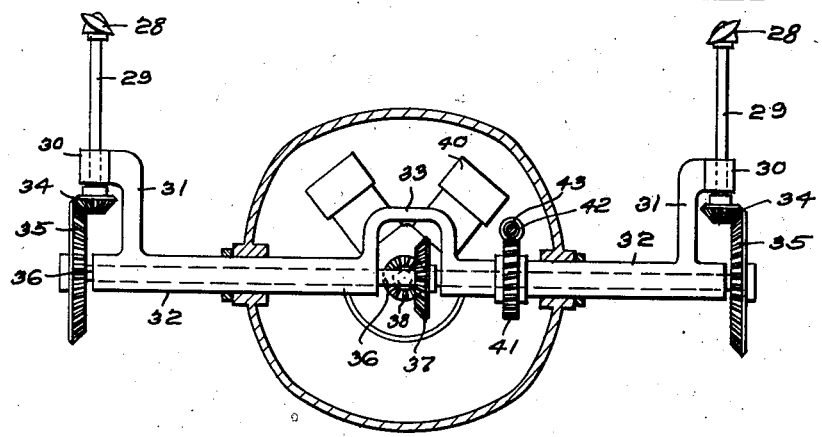

In the accompanying drawings, forming a part of this specification, and in which like numerals are employed to designate like parts throughout the same, Figure 1 is a side elevation of a combined airplane and helicopter embodying my invention, Figure 2 is a plan view of the same, Figure 3 is a horizontal longitudinal section through the machine, parts omitted, Figure 4 is a front elevation of the machine, and, Figure 5 is a transverse section taken on line 5—5 of Figure 3.

In the drawings, wherein for the purpose of illustration, is shown a preferred embodiment of my invention, the numeral 10 designates a fuselage, mounted upon the usual chassis 11. The fuselage is provided with a pilot seat 12, as shown.

Arranged above the fuselage, near its forward end, is a transverse sustaining plane 13, which is pivoted at 14, to upstanding struts 15, so that the sustaining plane may be angularly adjusted or turned upon its longitudinal axis. The struts 15 are rigidly mounted upon the fuselage, as shown, and are reinforced by diagonal guy wires 16, or the like. The sustaining plane 13 may assume the normal flying position, shown in Figure 1, or it may be tilted to a substantially vertical position, as indicated in dotted lines. The tilting action of the sustaining plane is effected by cables 17, which are attached to the sustaining plane, at 18. These cables are wound upon drums 19, and pass about guide pulleys 20. The cables 17 are continuous, and being wound upon the drums, when the drums are turned, one end portion is wound upon the drums, while the other end portion is paid out. The drums 19 are rigidly mounted upon a transverse rotatable shaft 20', equipped with the worm wheel 21, engaging a worm 22, carried by a shaft 23, in turn equipped with a hand wheel 24. It is thus seen that by turning the hand wheel, in the proper direction, such as clockwise, the rear ends of the cables 17 will be wound upon the drums 19, and the forward ends paid out, whereby the sustaining plane 13 will be swung to the vertical position. The reverse of this operation will return the sustaining plane to the horizontal position, and it will be locked in this position by virtue of the worm drive, although separate locking means may be employed, if desired.

The numeral 25 designates an internal combustion engine, suitably mounted in the front end of the fuselage, and this engine embodies a crank shaft 26, carrying at its forward end a vertical traveling propeller 27.

The numeral 28 designates horizontal lifting propellers, which are preferably located near the center of the fuselage, and spaced laterally therefrom, whereby there is an unobstructed passage beneath the same. These lifting propellers are rigidly mounted upon upstanding shafts 29, journaled in vertical bearings 31, formed upon the ends of radial arms 31. These radial arms are preferably formed integral with rock sleeves 32, which are rigidly connected, to turn as a unit, by means of a yoke 33 formed integral therewith. The means to turn the rock sleeves 32 will be described hereinafter.

Rigidly attached to the lower ends of the upstanding shafts 29, are horizontal bevel gears 34, engaging vertical bevel gears 35, which are rigidly secured to a transverse drive shaft 36, rotatable within the rock sleeves 32. The transverse shaft 36 has a bevel gear 37, rigidly secured thereto and this bevel gear 37 is driven by a bevel gear 38, rigidly mounted upon the crank shaft 39, of an internal combustion engine 40. The engine 40 is arranged rearwardly of the vertical shafts 29, while the engine 25 is positioned forwardly of the same. The engine 40 serves to counterbalance the engine 25 and associated elements, to some extent.

The shafts 29 are substantially vertical when the propellers 28 are lifting the machine vertically, but these shafts may be inclined or tilted forwardly, so they will aid the propeller 27, in effecting the longitudinal travel of the machine. The means to tilt the shafts 29 forwardly embodies a worm wheel 41, rigidly mounted upon one rock sleeve 32 and engaged by a worm 42, carried by a shaft 43, suitably mounted in the fuselage, and equipped with a hand wheel 44, by means of which the shaft 43 may be turned. The numeral 45 designates direction rudders, arranged near the forward end of the fuselage, and disposed outwardly of the sides of the same. These direction rudders are rigidly attached to vertical shafts 46, rotatable within bearings 47. The shafts 46 have cranks 48, projecting inwardly through openings 49. These cranks are connected with a cable 50, which is continuously wound about a drum 51, carried by an inclined shaft 52, provided at its upper end with a hand wheel 53. By turning the hand wheel in either direction, one direction rudder 45 will be positively swung outwardly by the adjacent end of the cable being wound upon the drum 51, while the opposite end of the cable is paid out, and the air current will force the adjacent direction rudder against the side of the fuselage. The resistance offered by the direction rudder, which has been swung outwardly will cause the machine to turn in the direction of such rudder.

The operation of the machine is as follows:
When the machine is at rest upon the ground, or the like, it may be raised vertically, by starting the engine 40, which will rotate the lifting propellers 28 in opposite directions. Before the lifting action is started, the sustaining plane 13 is tilted rearwardly to the vertical position, so that it will offer the least resistance to the rising of the machine. The shafts 29 are now substantially vertically arranged. When the desired elevation has been obtained, the sustaining plane 13 is returned to the horizontal position, and the engine 25 started, and the propeller 27 driven. The propeller 27 will now effect the longitudinal travel of the machine, in conjunction with the sustaining plane 13. The lifting propellers 28 may be stopped, or they may be tilted forwardly, and will supplement the propeller 27, in effecting the longitudinal travel of the machine.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:—

1. A combined airplane and helicopter, comprising a fuselage, a vertical traveling propeller carried by the forward end of the fuselage, a unitary transverse sustaining plane pivotally connected with the fuselage to turn upon its longitudinal axis with relation thereto, the transverse sustaining plane extending over the fuselage and projecting laterally beyond the sides of the same, means to hold the sustaining plane in a horizontal position and to shift the same to a substantially vertical position, a transverse rocking support secured to the fuselage at the rear of the sustaining plane and projecting laterally beyond the fuselage, upstanding propeller shafts carried by the ends of the rocking support, horizontal lifting propellers secured to the propeller shafts, the arrangement being such that the sweeps of the lifting propellers are entirely outwardly of the sides of the fuselage and entirely rearwardly of the sustaining plane when it is shifted to the substantially vertical position, means to turn the rocking support to tilt the lifting propellers from the horizontal so that they may co-act with the vertical propeller and aid in effecting the longitudinal travel of the machine, and means to drive all of said propellers.

2. A combined airplane and helicopter, comprising a fuselage, a vertical traveling propeller carried by the forward end of the fuselage, a unitary transverse sustaining plane pivotally connected with the fuselage to turn upon its longitudinal axis with relation thereto, the transverse sustaining plane extending over the fuselage and projecting laterally beyond the sides of the same, means to hold the sustaining plane in a horizontal position and to shift the same to a substantially vertical position, a transverse rocking support secured to the fuselage at the rear of the sustaining plane and projecting laterally beyond the fuselage, upstanding propeller shafts carried by the ends of the rocking support, horizontal lifting propellers secured to the propeller shafts, the arrangement being such that the sweeps of the lifting propellers are entirely outwardly of the sides of the fuselage and entirely rearwardly of the sustaining plane when it is shifted to the substantially vertical position, means to turn the rocking support to tilt the lifting propellers from the horizontal so that they may co-act with the vertical propeller and aid in effecting the longitudinal travel of the machine, an engine to drive the vertical traveling propeller, and a separate engine to drive the lifting propellers.

3. A combined airplane and helicopter, comprising a fuselage, a vertical traveling propeller carried by the forward end of the fuselage, a unitary transverse sustaining plane pivotally connected with the fuselage to turn its longitudinal axis with relation thereto, the transverse sustaining plane extending over the fuselage and projecting laterally beyond the sides of the same, means to hold the sustaining plane in a horizontal position and to shift the same to a substantially vertical position, a transverse rocking support secured to the fuselage at the rear of the sustaining plane and projecting laterally beyond the fuselage, upstanding propeller shafts carried by the ends of the rocking support, horizontal lifting propellers secured to the propeller shafts, the arrangement being such that the sweeps of the lifting propellers are entirely outwardly of the sides of the fuselage and entirely rearwardly of the sustaining plane when it is shifted to the substantially vertical position, means to turn the rocking support to tilt the lifting propellers from the horizontal so that they may co-act with the vertical propeller and aid in effecting the longitudinal travel of the machine, an engine mounted relatively stationary upon the fuselage near its forward end in advance of the rocking support to drive the vertical traveling propeller, and a separate engine mounted relatively stationary upon the fuselage at the rear of the rocking support to drive the lifting propellers.

In testimony whereof I affix my signature.

SIDNEY G. MEWBORN.